Sept. 11, 1951     K. W. OLSON     2,567,575
RESISTANCE MEASURING APPARATUS
Filed May 19, 1945     2 Sheets-Sheet 1
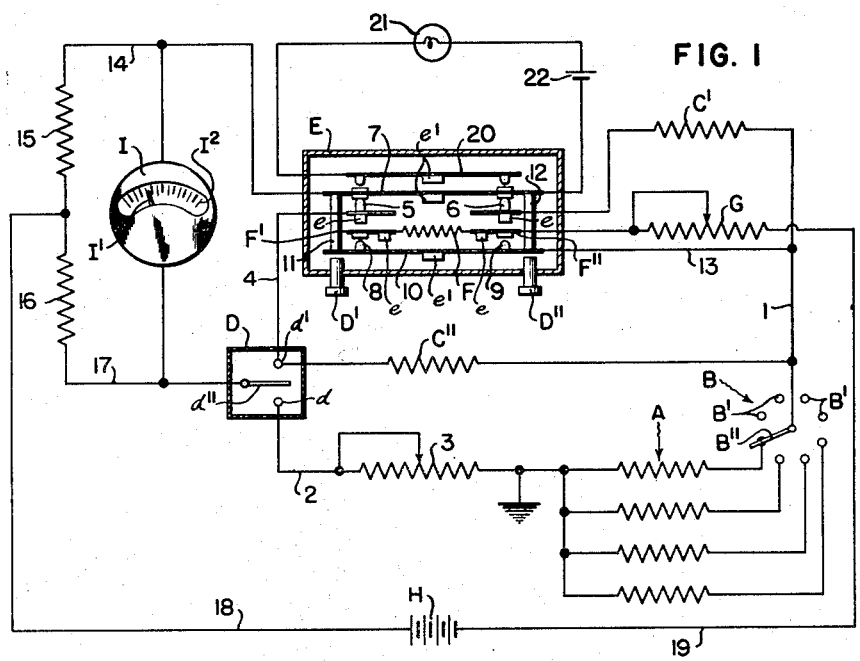
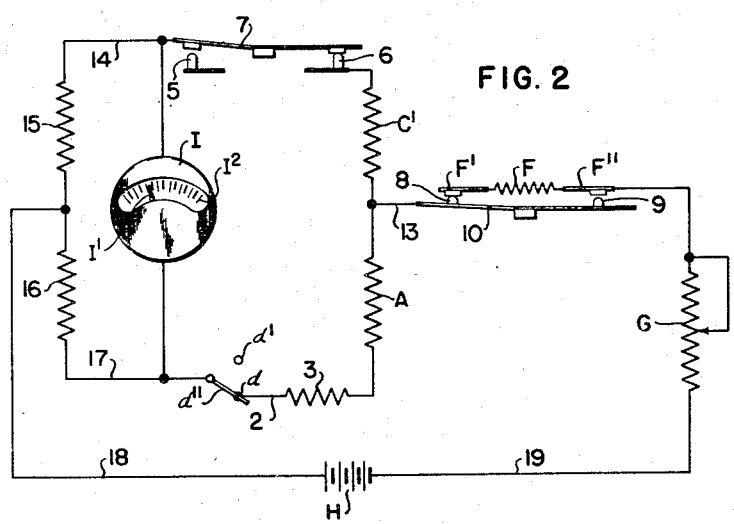
*INVENTOR.*
KENNETH W. OLSON
BY
ATTORNEY.

Sept. 11, 1951 K. W. OLSON 2,567,575
RESISTANCE MEASURING APPARATUS
Filed May 19, 1945 2 Sheets-Sheet 2

*INVENTOR.*
KENNETH W. OLSON
BY
*ATTORNEY.*

Patented Sept. 11, 1951

2,567,575

UNITED STATES PATENT OFFICE 2,567,575

RESISTANCE MEASURING APPARATUS

Kenneth W. Olson, Minneapolis, Minn., assignor, by mesne assignments, to Minneapolis-Honeywell Regulator Company, Minneapolis, Minn., a corporation of Delaware Application May 19, 1945, Serial No. 594,617

7 Claims. (Cl. 175—183)

The present invention relates to resistance pyrometry of the known type in which a resistance of unknown value forms one arm of a Wheatstone bridge which has two ratio arms and a comparison resistance arm, each of known resistance, and in which the deflection of a galvanometer connected to said bridge provides a measure of the resistance value of the first mentioned resistance.

The general object of the present invention is to provide improved apparatus of the above mentioned type, especially adapted for use in successively measuring each of a plurality of variable resistances having such different resistance values that they are advantageously measured by a multi-range galvanometer. Thus, for example, in one use of the present invention, provisions are made for so connecting variable resistances to be measured one at a time into the Wheatstone bridge that some of those resistances which have resistance values corresponding to temperatures in the range —20° F. to +50° F., and the others of said resistances which have temperatures within the range +50° F. to +120° F., are all measured by a galvanometer having a deflection scale range of 70 Fahrenheit degrees.

A more specific object of the invention is to provide measuring apparatus of the above mentioned type with improved switch means for adjusting the circuit connections to provide a proper measurement scale as the different variable resistances are operatively connected into the bridge circuit.

A still more specific object of the present invention is to combine two comparison resistances of different resistance values with a switch mechanism so that when each variable resistance is connected in the bridge circuit, the comparison resistance having the appropriate resistance value may also be connected into said circuit.

Another specific object of the invention is to provide suitable means for connecting the two comparison resistances in the bridge circuit as separate arms thereof for use in effecting periodical bridge circuit calibrating operations.

A further specific object of the invention is to combine electrical signal means with the switching means to indicate whether the bridge circuit is operative or inoperative.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described a preferred embodiment of the invention.

Of the drawings:

Fig. 1 is a diagram of a measuring system;

Fig. 2 is a diagram illustrating the use of parts shown in Fig. 1 in measuring a low range resistance;

Figure 3:
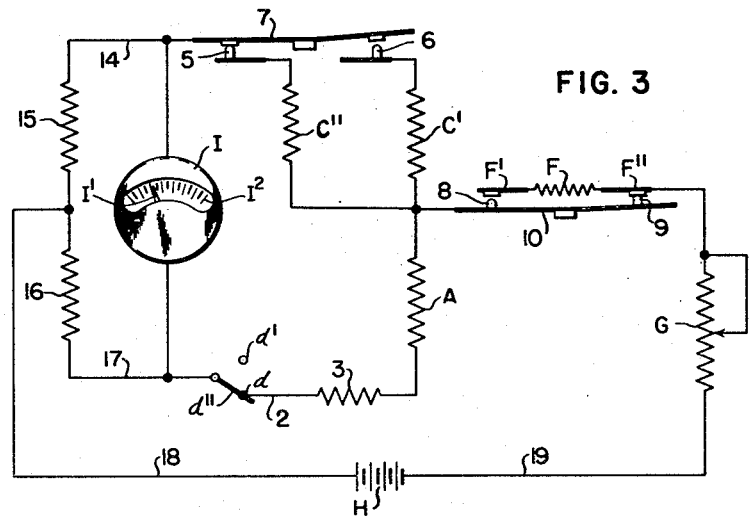
Fig. 3 is a diagram illustrating the use of parts shown in Fig. 1 in measuring a high range resistance.

In the drawings, and referring first to Fig. 1, A represents each of a plurality of variable resistances to be separately measured, and B represents a selector switch for separately connecting the different resistances A, one at a time, in a measuring bridge circuit. As shown, the switch B comprises a multiplicity of stationary contacts B', each connected to one terminal of a corresponding one of the resistances A. A pivoted switch contact B'' is angularly adjustable to successively engage the different contacts B'. A conductor I connects the movable switch contact B'' to one end of each of two comparison resistances C' and C''. As hereinafter explained, the resistance C' may be connected into a bridge circuit for use in making low range measurements, the resistance C'' may be connected into a bridge circuit for use in making high range measurements, and both of the resistances C' and C'' may be connected in a bridge circuit for calibration operations.

Whether one or the other of the resistances C' and C'' is operatively included in a measuring bridge circuit, or both of said resistances are operatively included in a calibration bridge circuit, is dependent upon the adjustments of control switch devices D, D' and D''. Those devices are shown as manually operable. The switch device D comprises stationary switch contacts $d$ and $d'$ and a movable contact or switch blade $d''$. The contact $d$ is connected by a conductor 2 and a variable calibrating resistance 3 to the terminal of each of the resistances A remote from the terminal of that resistance connected to a stationary switch contact B'. The contact $d'$ is directly connected through the resistance C'' to the conductor I. The contact $d'$ is also connected by a conductor 4 to a switch contact 5 forming a part of the switching mechanism included in a switch box or housing E, and with which the switch members D' and D'' are associated. The members D' and D'', as shown, are push buttons each of which moves upward when actuated.

The switch parts within the switch housing E include in addition to the contact 5, a similar contact 6, a horizontally elongated contact conductor 7 above and normally engaging the contacts 5 and 6, a resistor F carrying stationary switch contacts F' and F'' at its opposite ends which are above and normally out of engagement with uprising contact projections 8 and 9, respectively, secured to the opposite movable ends of a horizontally elongated contact conductor 10. At its ends, the member 10 also carries uprising parts or posts 11 and 12 shown as formed of insulating material and in alignment with the push buttons D' and D'', respectively. The mechanical details of the switch mechanism in the housing E may vary widely. In the form shown diagrammatically in Fig. 1 by way of illustration and example, contacts 5 and 6, and the contact terminals F' and F'' of the resistance F are anchored to the housing E by brackets e of insulating material, and the elongated conductors 7 and 10 are formed of spring metal and have their midportions anchored to the housing E by insulation brackets e'.

When the push button switch D' is actuated, it raises the adjacent end of the member 10 and thereby moves the contact projection 8 into engagement with the contact F' carried by the adjacent end of the resistor F. The actuation of the push button D' also operates through the post 11 to move the end of the member 7 adjacent the contact 5 out of engagement with the latter. Similarly, when the push button D'' is actuated, it operates through post 12 to lift the end of the member 7 adjacent the contact 6 out of engagement with the latter, and to move the contact 9 carried by the member 10 into engagement with the contact F'' carried by the adjacent end of the resistor F.

The contact member 10 which carries the contact projections 8 and 9, is connected by a conductor 13 to the conductor 1 and thereby to one end of each of the resistances C' and C''. The second end of the resistance C' is connected to the contact 6, and the second end of the resistance C'' is connected to the switch contact 5 through the switch contact d' and conductor 4 as previously explained. The switch contact member 7 is connected by a conductor 14 to one end of a ratio resistance 15. The other end of the ratio resistance 15 is connected to one end of the second ratio resistance 16. The second end of the latter is connected by a conductor 17 to the movable switch contact d'' of the switch D. The connected ends of the ratio resistances 15 and 16 are connected by a conductor 18 to one terminal of a bridge energizing battery H. The second terminal of that battery is connected by a conductor 19 to the end of a regulable resistance G and through the latter to the resistor F. A galvanometer I of milliammeter type is connected between the conductors 14 and 17.

Figure 4:
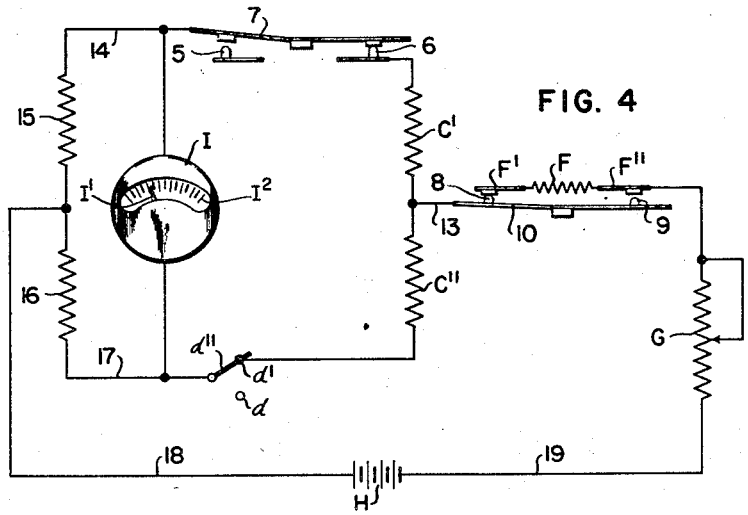
Fig. 4 illustrates the use of parts shown in Fig. 1 in calibrating the measuring system.

By suitable actuations or adjustments of the switch members d'', D' and D'', the ratio resistance arms 15 and 16 may be connected through the conductors 14 and 17 to other resistances which form the other two arms of one or another of the Wheatstone bridge circuits shown in Figs. 2, 3 and 4.

When the movable contact d'' of the switch D is in engagement with the contact d, the actuation of the push button D' connects one of the resistances A and the comparison resistance C' in circuit to form the low range measuring bridge circuit shown in Fig. 2. In Fig. 2, the resistance A being measured has one terminal connected through the resistance 3 and movable switch contact d'' to the conductor 17, and has its other terminal connected through the switch B, conductor 1, comparison resistance C', contact 6 and switch member 7 to the conductor 14. Thus in Fig. 2, the resistances 15 and 16 form two adjacent arms of a measuring bridge circuit which have their junction connected by the conductor 18 to one side of the battery H. The other two arms of the bridge circuit shown in Fig. 2 are respectively formed by the resistance C' and the resistance A which is being measured. The junction point of the resistances C' and A is connected through conductor 13, switch conductor 10, contact 8, contact F', resistance F, resistance G and conductor 19 to the second terminal of battery H. The pointer I' of the galvanommeter I then deflects over its scale $I^2$ in accordance with variations in the value of the ratio of the resistance A to the resistance C', relative to the value of the ratio of resistance 16 to the resistance 15.

With the movable contact d'' in engagement with the contact d of the switch D, the actuation of the push button D'' serves to connect one of the resistances A and the comparison resistance C'' to other bridge elements and thereby form the high range measuring bridge circuit shown in Fig. 3. The circuit shown in Fig. 3 differs from that shown in Fig. 2 only in that in Fig. 3 the comparison resistance C'' replaces the comparison resistance C' and in that the resistance F is out of the measuring circuit.

The formation of the low range Fig. 2 circuit by the actuation of the push button D', and the formation of the high range Fig. 3 circuit by the actuation of the push button D'', is explained by the fact that the actuation of the push button D' separates the contacts 5 and 7 while leaving the contacts 6 and 7 connected and moves the projection 8 of the contact member 10 into engagement with the terminal of the resistance F remote from the resistance G, while the actuation of the push button D'' separates the contacts 7 and 6 while leaving the contacts 7 and 5 in engagement, and connects the contact conductor 10 through its projection 9 to the terminal of the resistance F adjacent the resistance G.

In order that the bridge circuit should be a low range circuit when the resistance C' forms one arm of the bridge, and a high range circuit when the bridge arm C' is replaced by the resistance C'', the resistance value of the resistance C'' must be suitably higher than that of the resistance C'. The numerical values of the various resistances will vary with conditions of use. Merely by way of illustration and example, and not by way of limitation, I note that in one practical embodiment of the invention, the resistance elements A to be measured are so formed that at temperatures of −20° F., 50° F., and 120° F., the resistance value of each element A is respectively 335 ohms, 400 ohms, and about 465 ohms. In that embodiment, each of the resistances 15, 16, and C' is formed of manganin which has a zero temperature coefficient, and has a resistance value of 395 ohms. The resistance C'' which is also formed of manganin, has a resistance of 465 ohms. In that embodiment, the variable resistances 3 and F, provided for calibration purposes, may each be formed of manganin or other resistance material having a zero or very small temperature coefficient. In the above mentioned embodiment, the resistances $ and F have maximum resistance values of 100 ohms and 120 ohms, respectively, and the resistance G has a maximum resistance value of 300 ohms.

With the resistance values stated above by way of example, and with the measuring circuit in the condition shown in Fig. 2, the galvanommeter pointer I will deflect from the low end to the high end of the scale $I^2$, as the temperatures of the different elements measured vary from —20° F. to 50° F. With the bridge circuit in the condition shown in Fig. 3, the pointer I' will deflect from the low end to the high end of the scale $I^2$ as the temperatures of the elements A measured vary from 50° F. to 120° F.

For use in the manner just mentioned, the galvanometer scale $I^2$ may be divided into 70 one degree scale intervals, and may be suitably marked to show that the low scale range is from —20° F. to 50° F., and that the high scale range is from 50° F. to 120° F.

When the switch element $d''$ is shifted to engage the contact $d'$, the actuation of the push button D' establishes the calibration circuit shown in Fig. 4. The calibration circuit of Fig. 4 differs from the low range measuring circuit shown in Fig. 2, in that it includes the resistance C'' in lieu of one of the test resistances A. Since the bridge arms respectively including resistances 15, 16 and C' have equal resistance values and the arm including the resistance C'' has a different resistance, the voltage of the energizing battery H will necessarily create a potential difference between the terminals of the galvanometer I. The value of that potential difference will vary with the voltage of the battery H and the value of the resistance G in series with the battery. With the numerical values given above, the pointer I' should deflect to the high end of the scale when the resistance of the bridge arm formed by a resistance A and the resistance $ is 465 ohms and therefore should deflect to the high end of the scale when this bridge arm is formed by the comparison resistance C'' as shown in Fig. 4. If the pointer I' does not deflect to the high end of the scale $I^2$ when the calibration circuit shown in Fig. 4 is established, the calibrating resistance G should be adjusted to increase or decrease the energizing current as required to bring the pointer to the high end of the scale.

In some cases signal means may advantageously be associated with the switch mechanism in the housing E to indicate when the apparatus has been set into operation by the actuation of the push button switch D', or the actuation of the push button switch D''. In many cases in which such signal means are provided, it is sufficient to indicate the actuation by either of the push button switches without indicating which of said switches has been actuated. In one such signal arrangement shown in Fig. 1, a flexible contact conductor 20 supported by a central bracket $e'$, as are the contacts 7 and 10, is directly above and out of engagement with the contact 7 except when one or the other of the push buttons D' and D'' is advanced. The advancement of either of said push buttons moves the corresponding end of the contact 7 into engagement with the contact 20 and thereby closes an energizing circuit for a signal lamp 21, said circuit including the contacts 7 and 20 and a battery or other source of current 22.

As will be apparent, the resistances and thereby the temperatures, of the plurality of resistances A may be measured one at a time rapidly and accurately by successively adjusting the switch member B'' to successively connect the different resistances A to the measuring circuit and by advancing the appropriate switch D' or D'' when each resistance A is so connected to the measuring circuit. When the temperature of the resistance A to be measured is high enough to require measurement in the high range, the actuation of the push button switch D' should be avoided. In such case, the actuation of switch D' would subject the pointer I' to a deflective force tending to move it beyond the upper limit of its permitted range of movement, which is objectionable. In many cases, the user will know prior to its measurement whether the temperature of each resistance A is such as to require its measurement in the low range or in the high range. When the user does not have that knowledge, safe operation may be ensured by initially pushing the high range switch button D'', and then pushing the button D' only when the actuation of the button D'' has shown that the temperature of the resistance A is not high enough to be measured in the high range.

The switch mechanism within the housing E has operating characteristics peculiarly adapting the mechanism for use in establishing the different circuits shown in Figs. 2, 3 and 4. In the inoperative condition of the switch, the bridge energiizng circuit is open because the contact 10 then engages neither of the contacts F' and F''. In consequence, there is no waste of battery current during periods in which no one of the circuits shown in Figs. 2, 3 and 4 is established. An adjustment of the switch contact $d''$ is necessary to change to or from the calibration condition of the apparatus shown in Fig. 4. In the normal measuring use of the apparatus, however, the contact $d''$ is in continuous engagement with the contact $d$ and only the actuation of the push button D' or D'' is necessary to establish the measuring circuit respectively shown in Fig. 2, or Fig. 3. Furthermore, the actuation of either of the switches D' or D'' will energize the signal lamp 21 during the period in which the switch actuated is maintained in its advanced position.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

I claim:

1. Apparatus for separately measuring a plurality of test resistances comprising in combination first and second ratio resistances each of normally fixed resistance and having one end connected to one end of the other and each forming one of the two ratio arms of a bridge circuit, two comparison resistances having different normally fixed resistance values and each having one end connected to one end of the other, a selector switch operable to separately connect one end of each of said test resistances to the connected ends of said comparison resistances, switch means optionally operable to connect said first ratio resistance either to the second end of a test resistance or to the second end of one of said comparison resistances to form a third arm of said bridge circuit, and a second switch means optionally operable to connect the second end of one or the other of said comparison resistances to the second ratio resistance and thereby form the fourth arm of said bridge cirucit, a source of bridge energizing current connected between the connected ends of said ratio resistances and the connected ends of said third and fourth bridge arms, and a current meter connected between the ends of said ratio resistances respectively connected to said third and fourth bridge arms.

2. The combination with a plurality of test resistances of means for separately measuring the resistance value of each of said resistances comprising a pair of ratio resistances each of normally fixed resistance and connected at one end to one end of the other, said connected ends forming one junction and the other ends of said ratio resistances forming the second and third junctions of a bridge circuit in which said ratio resistances form ratio arms, first and second comparison resistors having different normally fixed resistance values and each having one end connected to one end of the other at the fourth junction of said bridge circuit, a selector switch operable to separately connect one end of each of said test resistances to said fourth junction, a switch member operable to connect the second end of said first comparison resistance to said second junction, a second switch member operable to connect the second end of said second comparison resistance to said second junction, and a third switch member optionally operable to connect either the second end of said second comparison resistance or the ends of the test resistances remote from said selector switch to said third junction, bridge energizing means connected to said one and fourth junctions, and a current meter connected between said second and third junctions.

3. Apparatus as specified in claim 2 including a normally open signal circuit and means actuated to close said circuit by the actuation of either of said second and third switch members.

4. Apparatus for measuring a test resistance comprising in combination first and second ratio resistances each of normally fixed resistance and having one end connected to one end of the other, two comparison resistances having different normally fixed resistance values and each having one end connected to one end of the other, means connecting one end of a test resistance to the connected ends of said comparison resistances, switching means optionally operable to connect the second end of said first ratio resistance either to the second end of said test resistance or to the second end of one of said comparison resistances, a second switching means optionally operable to connect the second end of said second ratio resistance to the second end of either the first or second comparison resistance, a first connection between the connected ends of said ratio resistances and the connected ends of said comparison resistances, a second connection between the second ends of said ratio resistances, a source of bridge energizing current in one, and a measuring device in the second of said two connections.

5. Apparatus for measuring a test resistance comprising in combination first and second ratio resistances each of normally fixed resistance and having one end connected to one end of the other, two comparison resistances having different normally fixed resistance values and each having one end connected to one end of the other, means for connecting one end of said test resistance to the connected ends of said comparison resistances, switching means optionally operable to connect the second end of said first ratio resistance to the second end of said comparison resistor, or to the second end of said test resistance, a second switching means optionally operable to connect the second end of said second ratio resistance to the second end of either the first or second comparison resistance, a galvanometer of milliameter type connected between the second ends of said ratio resistances and a source of bridge energizing current connected between the connected ends of said ratio resistance and said second switching means and connected through the latter to the connected ends of said comparison resistances when said second switching means is operated to connect the second end of either comparison resistance to the second end of said second ratio resistance.

6. Apparatus for measuring a test resistance comprising in combination first and second ratio resistances each of normally fixed resistance and having one end connected to one end of the other, two comparison resistances having different, normally fixed, resistance values and each having one end connected to one end of the other, means for connecting one end of a test resistance to the connected ends of said comparison resistances, means operable to connect the second end of said first ratio resistance to the second end of said test resistance, switching means optionally operable to connect the second end of said second ratio resistance to the second end of either the first or second comparison resistor, a first connection between the connected ends of said ratio resistances and the connected ends of said comparison resistances, a second connection between the second ends of said ratio resistances, a source of bridge energizing current in one, and a measuring galvanometer of milliameter type in the second of said two connections.

7. Apparatus as specified in claim 6, in which said switching means comprises first and second normally open, push button switches, respectively operable, when closed, to connect the second end of said second ratio resistance to the second ends of said first and second comparison resistors respectively.

KENNETH W. OLSON.

REFERENCES CITED

The following references are of record in the file of this patent:

UNITED STATES PATENTS

| Number | Name | Date |
| --- | --- | --- |
| 1,460,530 | Brown et al. | July 3, 1923 |
| 1,665,397 | Wunsch | Apr. 10, 1928 |
| 1,961,965 | Fisher | June 5, 1934 |
| 2,135,587 | Lovelady | Nov. 8, 1938 |
| 2,322,162 | Schmidt | June 15, 1943 |

FOREIGN PATENTS

| Number | Country | Date |
| --- | --- | --- |
| 566,105 | Great Britain | Dec. 13, 1944 |